(12) United States Patent
Calvel et al.

(10) Patent No.: US 10,427,370 B2
(45) Date of Patent: *Oct. 1, 2019

(54) MOLDING ELEMENT FOR MANUFACTURING A NOISE REDUCING TREAD

(71) Applicant: COMPAGNIE GENERALE DES ETABLISSEMENTS MICHELIN, Clermont-Ferrand (FR)

(72) Inventors: Romain Calvel, Clermont-Ferrand (FR); Xavier Marduel, Tokyo (JP)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/763,371

(22) PCT Filed: Sep. 20, 2016

(86) PCT No.: PCT/JP2016/004284
§ 371 (c)(1),
(2) Date: Mar. 26, 2018

(87) PCT Pub. No.: WO2017/056455
PCT Pub. Date: Apr. 6, 2017

(65) Prior Publication Data
US 2018/0264761 A1    Sep. 20, 2018

(30) Foreign Application Priority Data

Sep. 30, 2015    (WO) .................. PCT/JP2015/078425

(51) Int. Cl.
*B29D 30/06* (2006.01)
*B29C 33/12* (2006.01)

(52) U.S. Cl.
CPC ........ *B29D 30/0606* (2013.01); *B29C 33/123* (2013.01); *B29D 2030/061* (2013.01); *B29D 2030/0612* (2013.01)

(58) Field of Classification Search
CPC ........ B29D 30/0606; B29D 2030/0612; B29C 33/123; B60C 11/1369
See application file for complete search history.

(56) References Cited

U.S. PATENT DOCUMENTS 6,143,223 A    11/2000 Merino Lopez
6,484,772 B1 *  11/2002 De Labareyre ........ B29D 30/52
                                                152/209.17

(Continued)

FOREIGN PATENT DOCUMENTS

EP    0858875 A1    8/1998
EP    0925907 A1    6/1999

(Continued)

OTHER PUBLICATIONS

International Search Report issued in related PCT application No. PCT/JP2015/078425,dated Dec. 28, 2015.

(Continued)

*Primary Examiner* — James P Mackey
(74) *Attorney, Agent, or Firm* — Dickinson Wright PLLC

(57) ABSTRACT

The present disclosure is related to a molding element for a mold used for manufacturing a tire. The molding element has a molding surface for forming a contact face of the contacting elements and a rib for forming the groove between adjacent contacting elements, at least two rib side faces forming the side faces of the contacting element, the rib having a notching portion, a guiding member made of a material different from a material of the molding element is received in the notching portion and has two opposite side faces configured to form a part of the side faces of the (Continued)

contacting element and a top face configured to form a part of a bottom of the axial groove.

14 Claims, 13 Drawing Sheets

(56) References Cited

U.S. PATENT DOCUMENTS

| | | |
|---|---|---|
| 2004/0016491 A1 | 1/2004 | Martin et al. |
| 2005/0238744 A1 | 10/2005 | Nakai |
| 2008/0152744 A1 | 6/2008 | Nguyen et al. |
| 2010/0186861 A1* | 7/2010 | Ishiguro ............. B60C 11/0306 152/209.25 |
| 2015/0174842 A1 | 6/2015 | Pialot, Jr. |
| 2018/0001715 A1 | 1/2018 | Tezuka |

FOREIGN PATENT DOCUMENTS

| | | |
|---|---|---|
| EP | 1588820 A1 | 10/2005 |
| JP | 55-113606 U | 8/1980 |
| JP | 10-071617 A | 3/1998 |
| JP | 11-268050 A | 10/1999 |
| JP | 2002-331525 A | 11/2002 |
| JP | 2004-529023 A | 9/2004 |
| JP | 2005-305921 A | 11/2005 |
| JP | 2015-523239 A | 8/2015 |
| KR | 20130078562 A | 7/2013 |
| WO | 2016/104662 A1 | 6/2016 |

OTHER PUBLICATIONS

International Search Report issued in related PCT application No. PCT/JP2016/004284, dated Dec. 6, 2016.

* cited by examiner

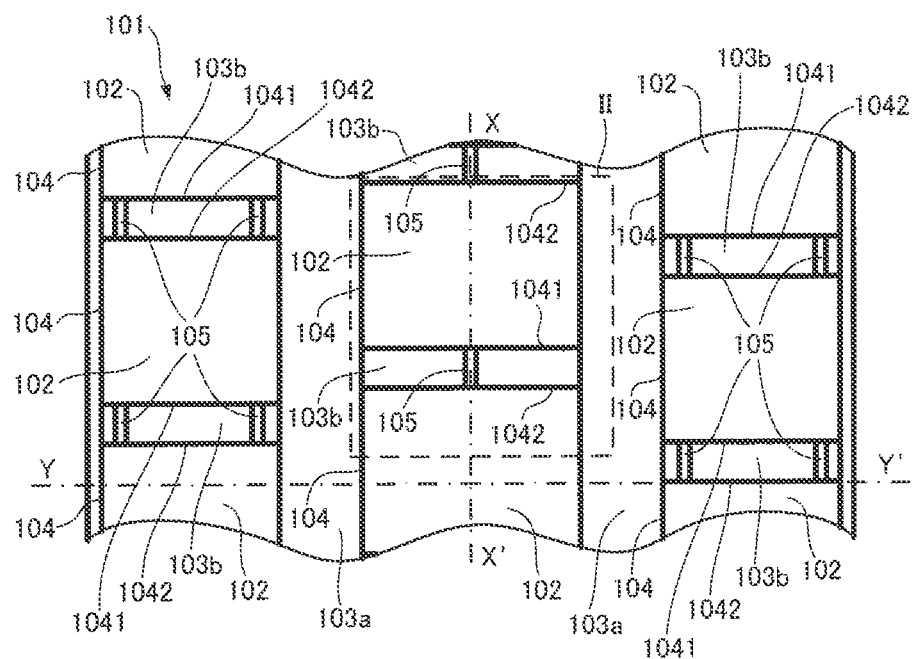
[Fig. 1]

[Fig. 2]
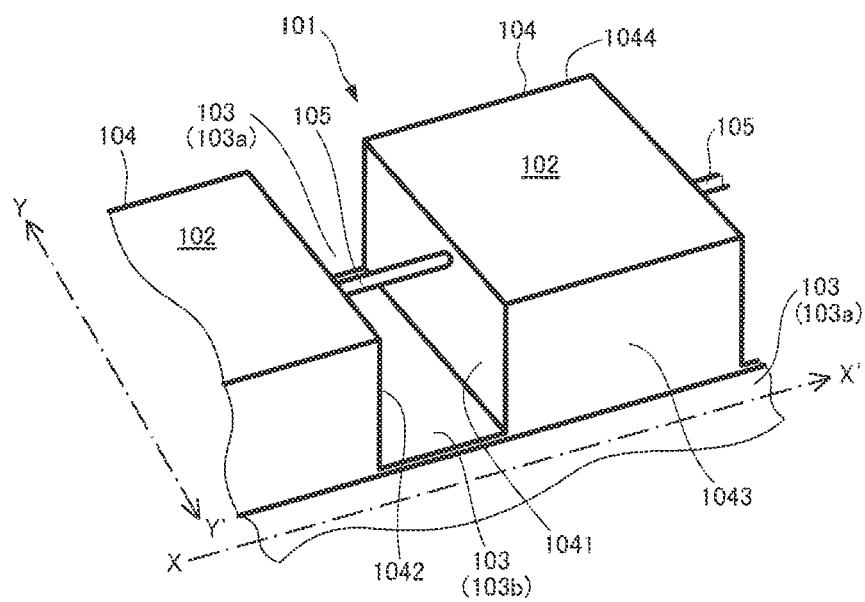

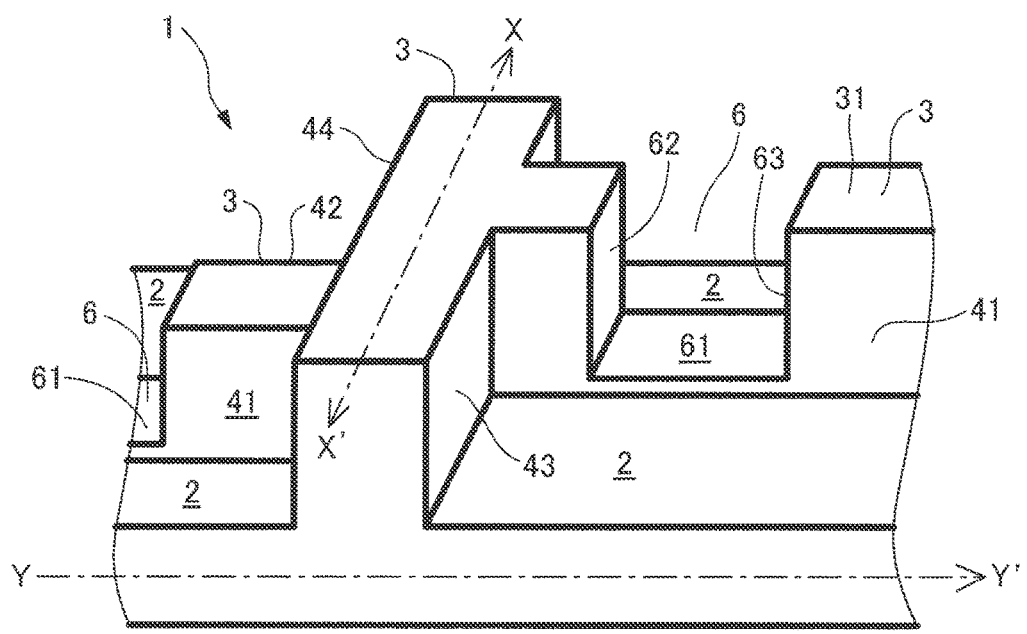
[Fig. 3]

[Fig. 4]
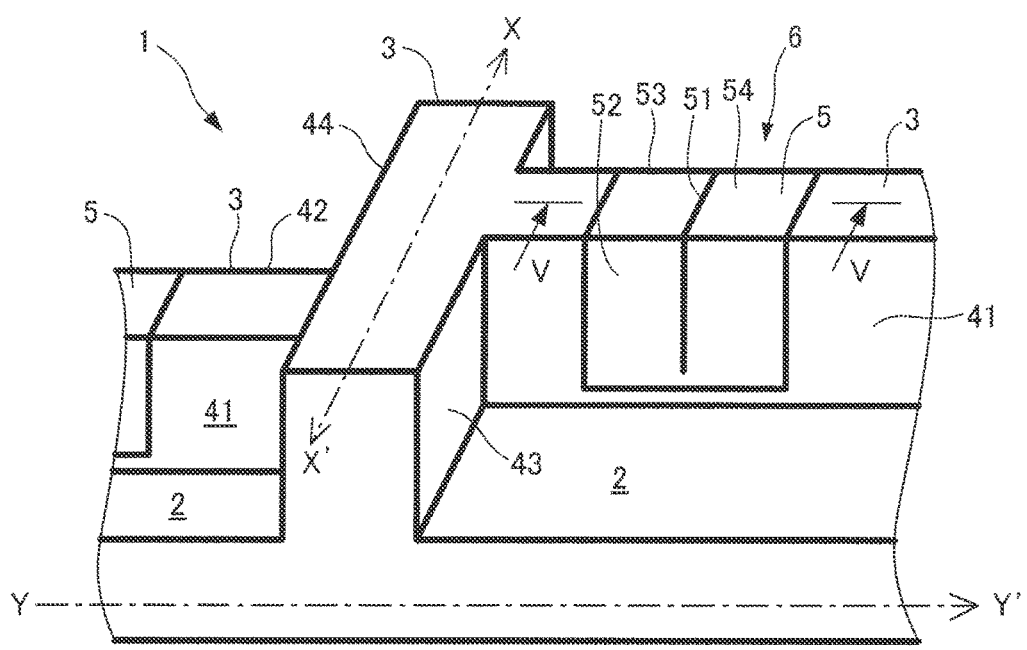

[Fig. 5]
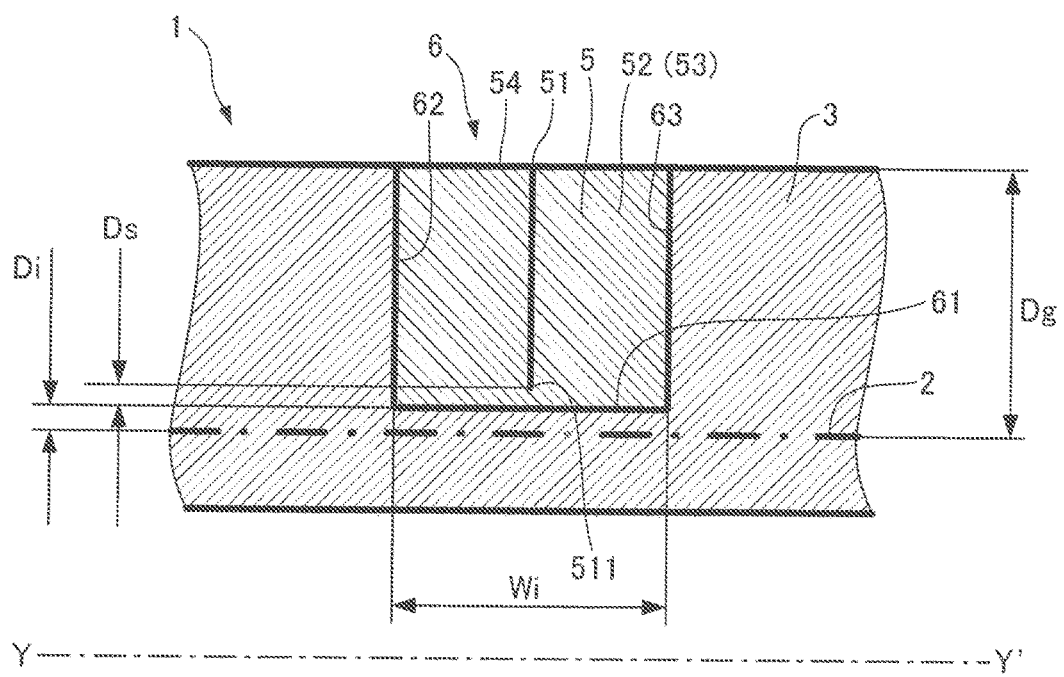

[Fig. 6]
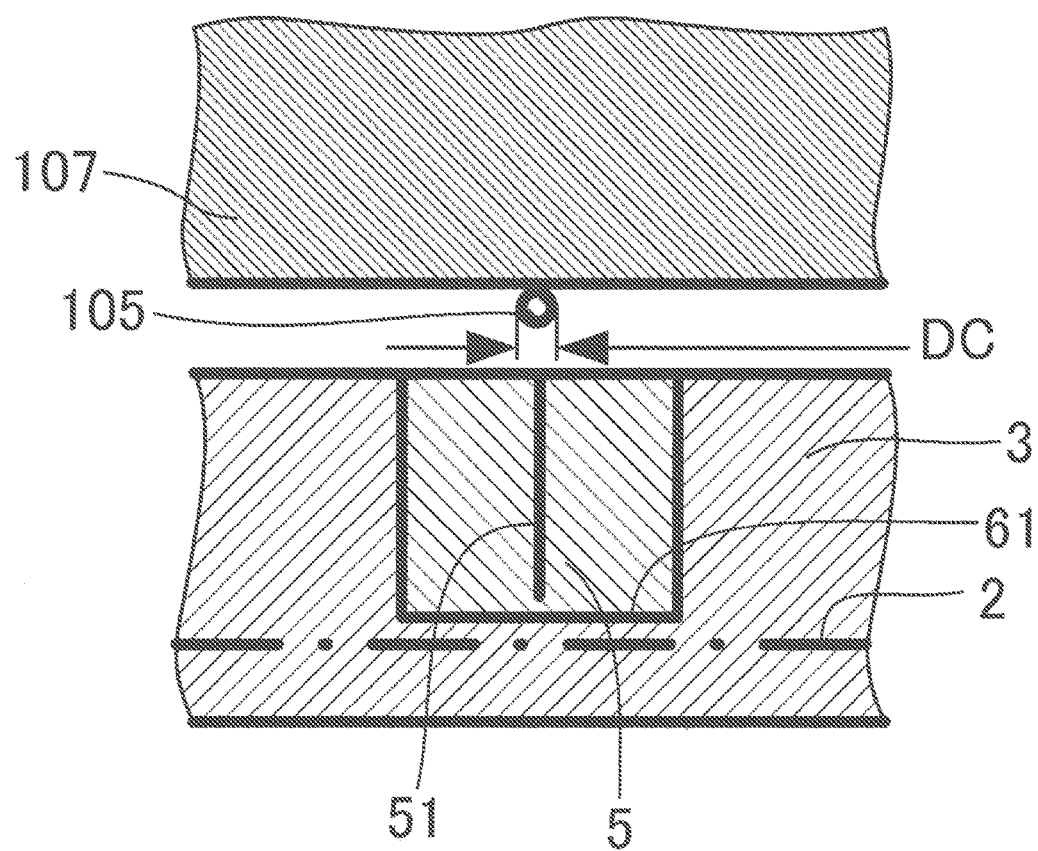

[Fig. 7]
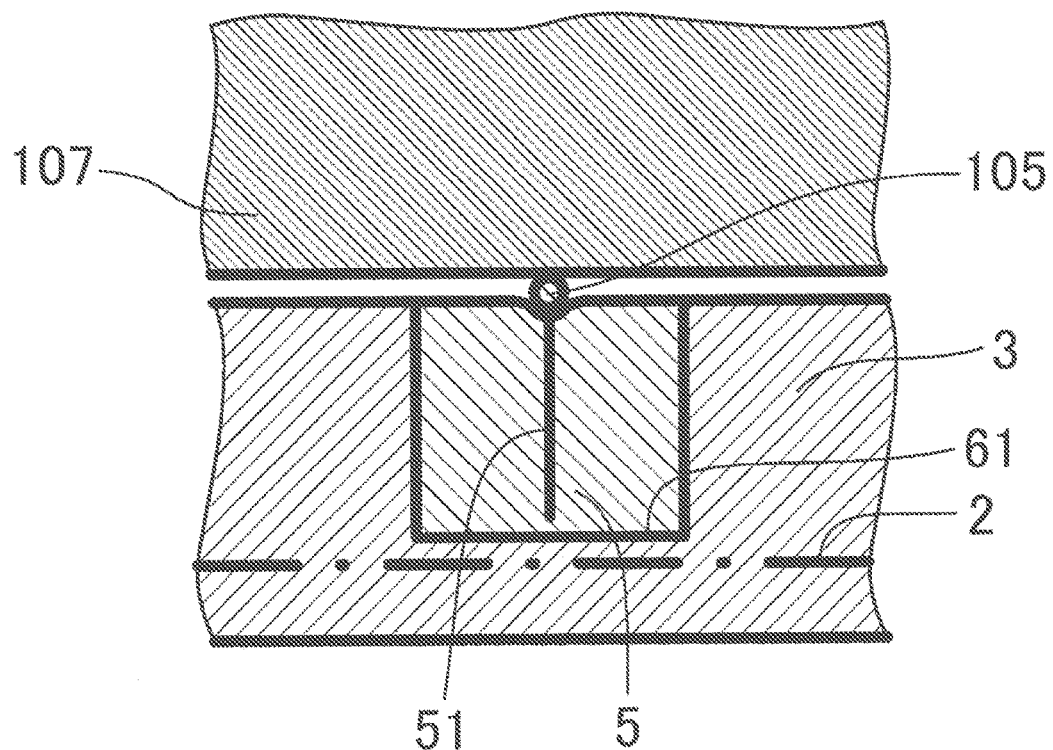

[Fig. 8]
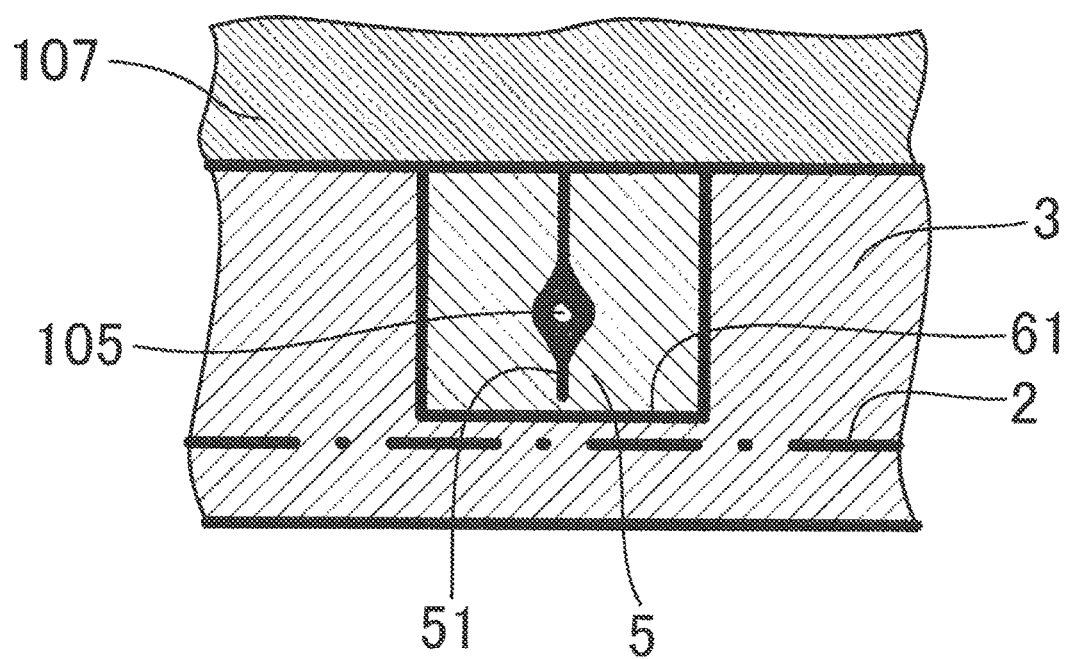

[Fig. 9]
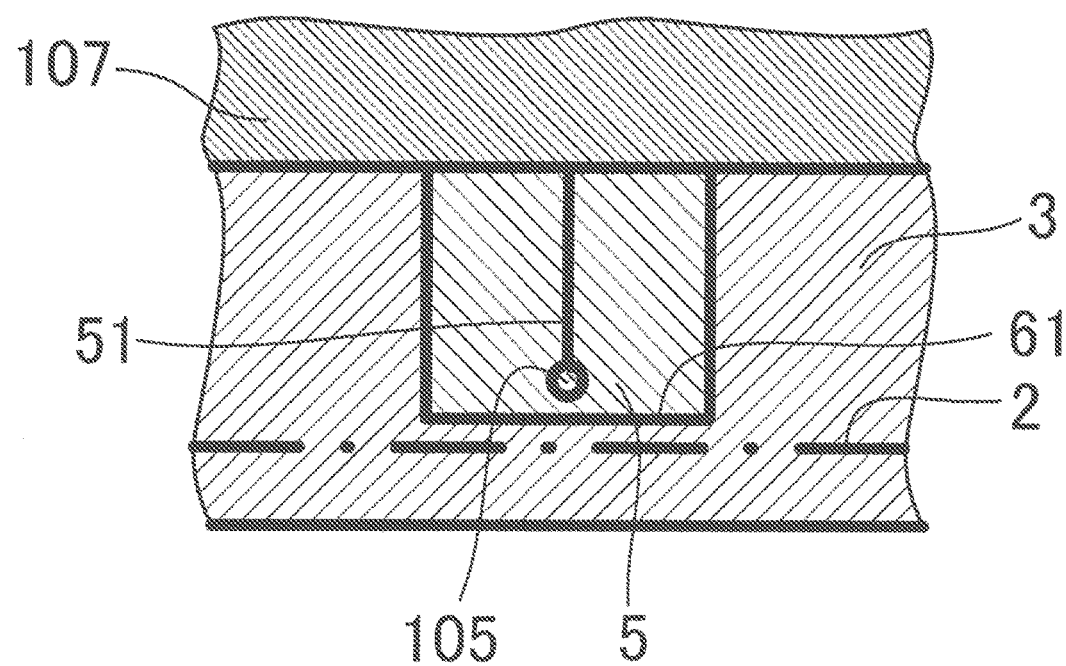

[Fig. 10]
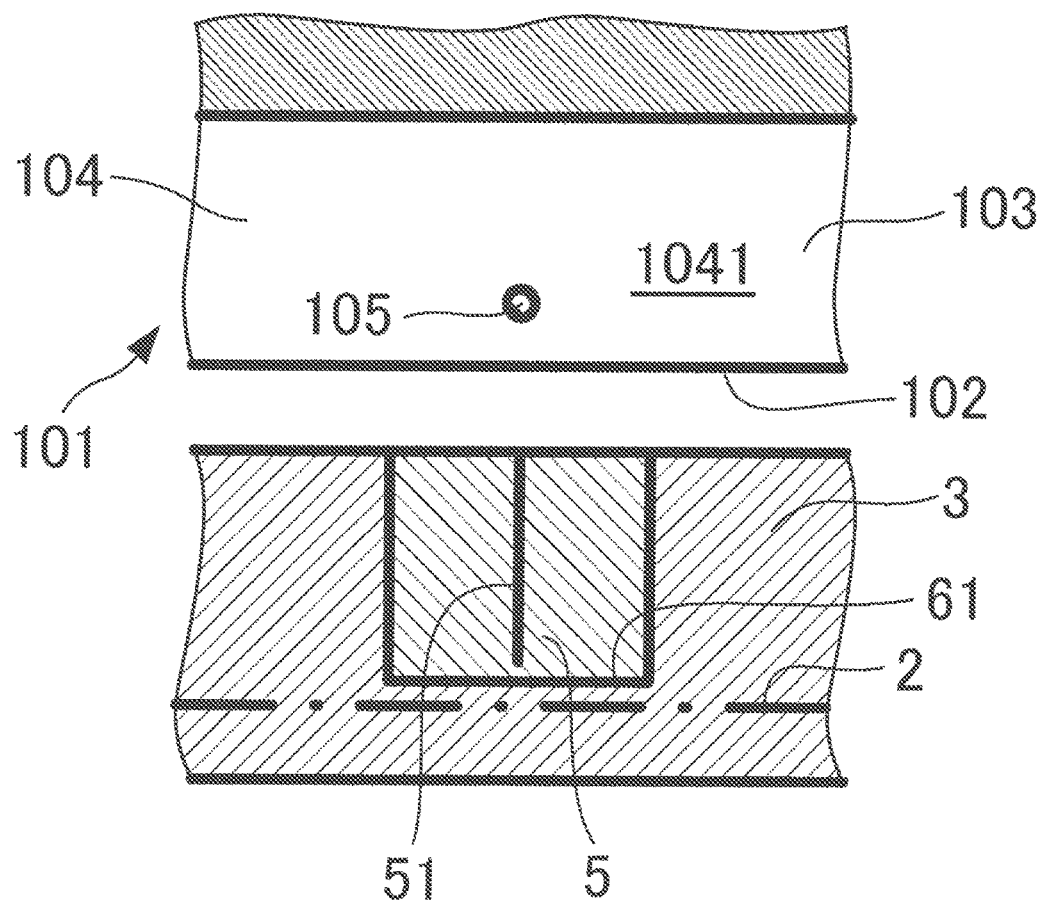

[Fig. 11]
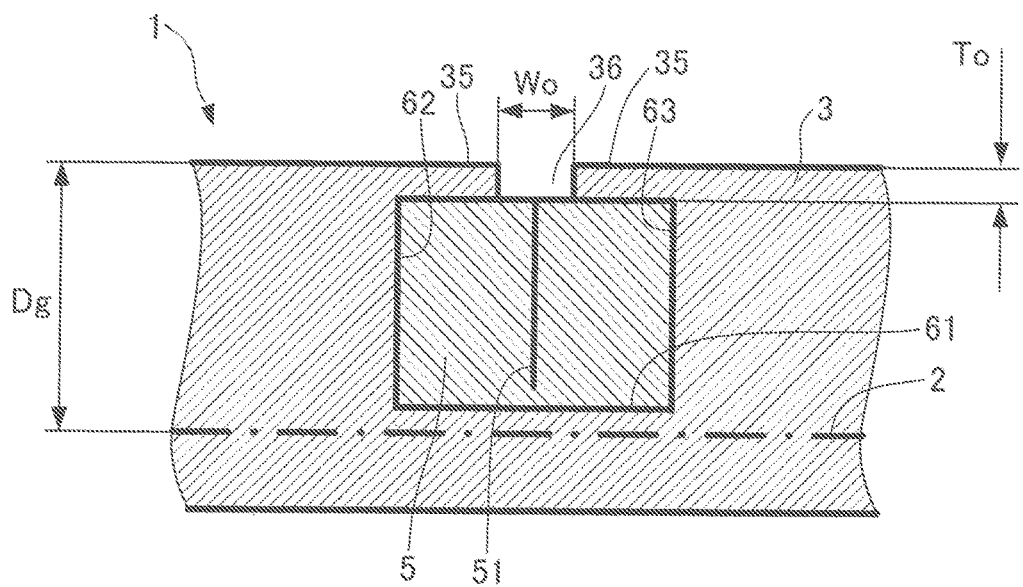

[Fig. 12]
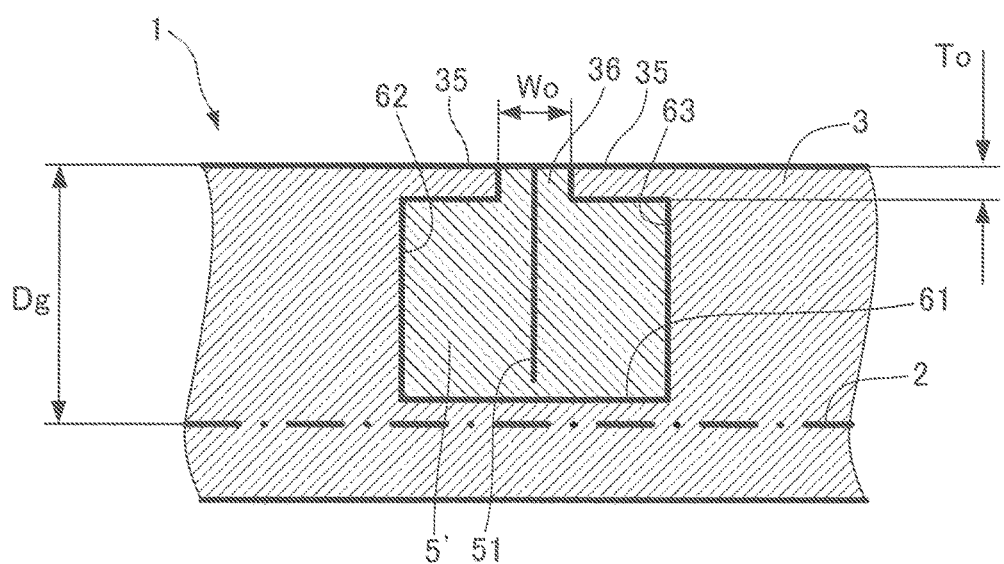

[Fig. 13]
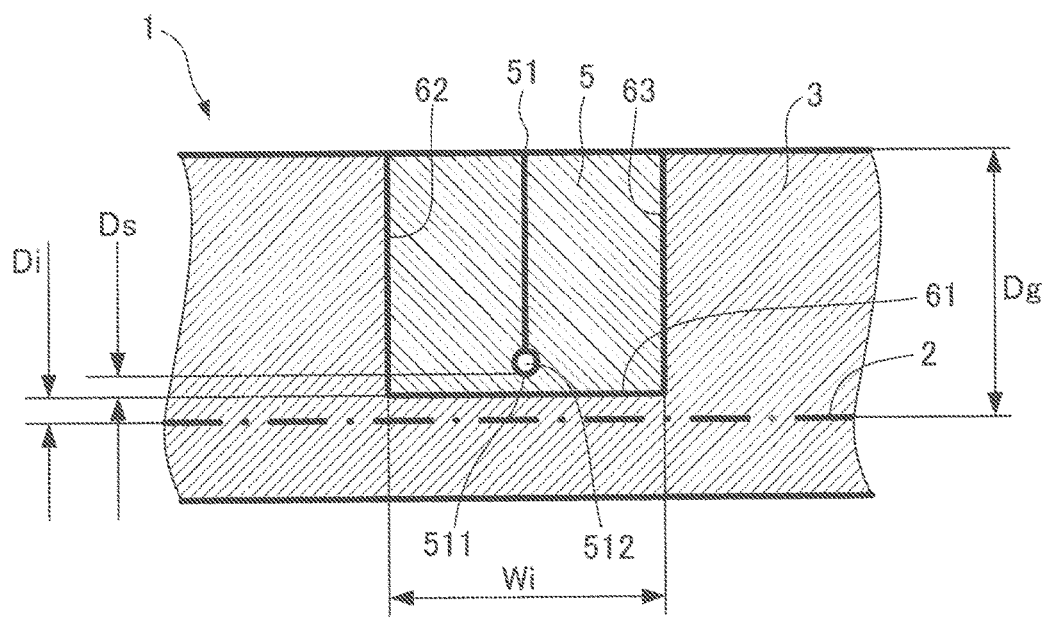

MOLDING ELEMENT FOR MANUFACTURING A NOISE REDUCING TREAD

CROSS-REFERENCE TO RELATED APPLICATIONS

This application is a 371 national phase entry of PCT/JP2016/004284, filed 20 Sep. 2016, which claims the benefit of International Patent Application No. PCT/JP2015/078425 filed 30 Sep. 2015.

BACKGROUND

In recent years, there has been a desire to improve quality of vehicles leads, from the view point of occupant's comfort and environmental considerations, and as such, there has been a desire for various noise reduction implementations, in particular pass-by noise.

When a contacting element on a tread of a tire enters to or exits from a contact patch during rolling, the tread is forced to bend due to flattening. At this stage, geometrical discontinuity caused by periodical contact of relatively axial grooves to the contact patch leads inhomogeneity of a bending stiffness of the tread in a circumferential direction and excites internal construction of the tire to generate noise.

In order to reduce such inhomogeneity of the bending stiffness of the tread in a circumferential direction, it is known that reduction of a volume of the axial groove is effective. However, it is also known that reduction of the volume of the axial groove penalizes hydroplaning performance of the tread. Thus, it is desired to improve noise performance while maintaining hydroplaning performance.

The applicants have proposed in FIG. 1 of an international patent application PCT/JP2015/086150, a pneumatic tire tread having a connecting member connecting a transverse face of a contacting element to a transverse face of a circumferentially adjacent contacting element and being made of a material having a higher Young modulus than a Young modulus of a contacting element to obtain satisfactory hydroplaning performance and satisfactory noise performance at the same time. In FIG. 6, is disclosed a pneumatic tire tread having a connecting member connecting a transverse face of a contacting element to a transverse face of circumferentially adjacent contacting element and extending continuously through two transverse faces of the same contacting element for improving productivity of such tread.

However, embedding such connecting member in the contacting element so as to connect two side faces of adjacent contacting elements across the groove requires complicated manufacturing process, thus improvement of productivity of such tread is still insufficient.

EP0858875A1 discloses, in FIG. 1, a mold having a first die and a second die functionally adapted to form at least one orifice allowing a rubber passing through the orifice during molding. However with such configuration, it is difficult to remove the first die or the second die which forms a bottom of a groove or an incision in particular in a form of a tire, thus a complicated process for removing such die is still required.

KR20130078562A discloses, in FIGS. 3 to 5, a method and a mold for manufacturing a pneumatic tire having a reinforced cord crossing a groove using a reinforced cord insertion block installed in a mold. However with such configuration, it is difficult to give a movement to the reinforced cord insertion block, necessary to place the reinforced cord into the reinforced cord insertion block thus a complicated process is still required, and moreover difficult to prevent rubber from flashing into the groove.

US20080152744A1 discloses, in FIG. 1, a molding element suitable for molding sunken grooves or sipes in a tread, and such device may be comprised of a thin flexible wire. However, with such molding element it is difficult to place a connecting member as to connect side faces of different contacting elements as the thin flexible wire is pulled out from the tread.

Definitions

A "tire" means all types of elastic tire whether or not subjected to an internal pressure.

A "green tire" means a superposition of a plurality of semi-finished rubber products present in the form of strips or sheets, with or without reinforcement. The green tire is intended to be vulcanized in a mold in order to obtain the tire.

A "tread" of a tire means a quantity of rubber material bounded by lateral surfaces and by two main surfaces one of which is intended to come into contact with ground when the tire is rolling.

A "mold" means a collection of separate molding elements which, when brought closer towards one another, delimit a toroidal molding space.

A "molding element" of a mold means part of a mold. A molding element is, for example, a mold segment.

A "molding surface" of a molding element means a surface of the mold that is intended to mold a surface of the tread.

A "modulus at 10% elongation" is a tensile stress (in MPa) at ten percent (10%) elongation measured according to ASTM standard D412.

An "elongation rupture" is an elongation property in elongation (in %) at break according to ASTM standard D412.

A "shore A hardness" is a durometer hardness according to ASTM standard D2240 type A.

A "center region" is a central region when a guiding member being equally divided into three in widthwise direction against a maximum width of the guiding member.

A "groove" is a space between two rubber faces/sidewalls which do not contact between themselves under usual rolling condition connected by another rubber face/bottom. A groove has a width and a depth.

It is thus an object of the disclosure to provide a molding element for a mold used for manufacturing a tread of a tire, such molding element can improve productivity for manufacturing a tread provided with a connecting member connecting two side faces of adjacent contacting elements.

DISCLOSURE SUMMARY

The present disclosure provide a molding element for a mold used for manufacturing a tread of a tire having a plurality of contacting element delimited by a plurality of grooves and a connecting member connecting two side faces of adjacent contacting elements, the molding element having a molding surface for forming a contact face of the contacting elements intended to come into contact with ground during rolling and a rib for forming the groove between adjacent contacting elements, at least two rib side faces forming the side faces of the contacting element, the rib having a notching portion, a guiding member made of a material different from a material of the molding element is received in the notching portion and has two opposite side faces configured to form a part of the side faces of the contacting element and a top face configured to form a part of a bottom of the axial groove, and in that said different material has a modulus at 10% elongation lower than that of the molding element, and in that the guiding member has a guiding slit extending from one of the two opposite side faces to the other of the two opposite side faces through the guiding member and radially from the top face.

This arrangement improves productivity for manufacturing a tread provided with a connecting member connecting two side faces of adjacent contacting elements.

Since the guiding slit extends from one of the opposite two side faces to the other of the opposite two side faces through the guiding member, the guiding slit can receive the connecting member to be positioned at a predetermined position during molding, and release the connecting member from the mold during demolding without any complicated process.

As a result, productivity for manufacturing the tread provided with the connecting member can be improved.

Since the material constituting the guiding member has lower modulus at 10% elongation than that of the molding element, it is possible to let the connecting member enter to/exit from the guiding slit. Once the connecting member has passed, the guiding slit is substantially closed for preventing rubber from flashing into the guiding slit during molding which would prevent rubber from flashing in the groove after demolding.

Since the guiding member made of the material different from the material constituting the molding element is received in the notching portion, it is possible to maintain a form of the side faces of the contacting element. As a result hydroplaning performance can be maintained. At the same time, since the guiding member which exposed to stresses from the connecting member is constructed as a separate and replaceable member in the molding element, maintenance of the molding element can be easier.

In another preferred embodiment, the material constituting the guiding member is an elastomeric composition.

According to this arrangement, penetration of rubber into the guiding slit during molding would further effectively be inhibited, thus rubber flashing in the groove after demolding will be further effectively prevented.

In another preferred embodiment, the guiding slit has a closed end radially closer to a bottom face of the notching portion.

According to this arrangement, it is possible to prevent the connecting member from erroneously entering into a space between the guiding member and a bottom face of the notching portion, thus productivity of the tread would further be improved.

In another preferred embodiment, a radial distance Ds between the bottom face of the notching portion and the closed end of the guiding slit of the guiding member is more than or equal to 1.0 mm.

According to this arrangement, it is possible to prevent the guiding slit from breaking towards the bottom face of the notching portion during molding, thus productivity of the tread is improved.

In another preferred embodiment, a modulus of the elastomeric composition constituting the guiding member at 10% elongation is within the range of 0.8 MPa and 2.5 MPa.

If this modulus at 10% elongation is less than 0.8 MPa, the guiding member may distort too much causing difficulty in letting the connecting member enter to the guiding slit resulting degradation in productivity. If this modulus at 10% elongation is more than 2.5 MPa, the guiding member may have difficulty in letting the connecting member enter to the end closer to the molding surface in the guiding slit resulting degradation in productivity either. By setting this 10% elongation at break of the elastomeric composition within the range of 0.8 MPa and 2.5 MPa, productivity for manufacturing the tread having the connecting member can effectively be improved.

The modulus at 10% elongation of the elastomeric composition constituting the guiding member is preferably in a range of 0.9 MPa to 2.0 MPa, more preferably in a range of 1.0 MPa to 1.7 MPa.

In another preferred embodiment, an elongation rupture of the elastomeric composition constituting the guiding member is more than or equal to 50%.

If the elongation rupture of the elastomeric composition constituting the guiding member is less than 50%, there is a risk that the guiding member may be destroyed/split by very high stress applied and concentrated via the connecting member during molding and demolding resulting degradation in productivity. By setting this elongation rupture of the elastomeric composition constituting the guiding member being more than or equal to 50%, productivity for manufacturing the tread provided with the connecting member can effectively be improved.

The elongation rupture of the elastomeric composition constituting the guiding member is preferably more than or equal to 100%, more preferably more than or equal to 150% and still more preferably between 200% and 500%.

In another preferred embodiment, a shore A hardness of the elastomeric composition constituting the guiding member is within the range of 30 and 60.

If this shore A hardness is less than 30, the guiding member may distort too much causing difficulty in letting the connecting member enter to the guiding slit resulting degradation in productivity. If this shore A hardness is more than 60, the guiding member may have difficulty in letting the connecting member enter to the end closer to the molding surface in the guiding slit resulting degradation in productivity either. By setting this shore A hardness of the elastomeric composition constituting the guiding member within the range of 30 and 60, productivity for manufacturing the tread provided with the connecting member can effectively be improved.

The shore A hardness of the elastomeric composition constituting the guiding member is preferably within the range of 35 and 50.

In another preferred embodiment, the guiding slit is widthwisely located, in cut view perpendicular to the molding surface and parallel to an extension direction of the rib having the notching portion, at a center region of the guiding member.

According to this arrangement, high stress applied via the connecting member to the guiding member during molding and demolding would be distributed evenly throughout the guiding member. As a result, it is possible to provide good endurance of the guiding member resulting further improvement on productivity.

In another preferred embodiment, a width Wi of the guiding member is more than or equal to twice a diameter DC of the connecting member.

If this width Wi of the guiding member is less than twice the diameter DC of the connecting member, there is a risk that the connecting member is not able to pass through the guiding slit during molding and demolding due to insufficient volume to pass through for the connecting member to compress the guiding member. By setting this width Wi of the guiding member being more than or equal to twice the diameter DC of the connecting member, when the connecting member passes through the guiding slit, the guiding member can sufficiently deform so as to provide enough space for passage of the connecting member and therefore, productivity for manufacturing the tread provided with the connecting member can effectively be improved.

The width Wi of the guiding member is preferably less than 4 times the diameter DC of the connecting member. In case the guiding member has non-rectangular shape, this width Wi should be considered as a minimum width of the guiding member.

In another preferred embodiment, the top face of the guiding member is partly covered by a pair of rib projecting members projecting inwardly from opposed side faces of the notching portion and the guiding slit is exposed through a rib projection opening portion formed between the pair of rib projecting members.

According to this arrangement, the pair of rib projecting member is able to prevent the guiding member from slipping out from the rib during demolding while securing the connecting member entering to/exiting from the guiding slit. As a result, productivity for manufacturing the tread provided with the connecting member can effectively be improved.

In another preferred embodiment, the rib projection opening portion is devoid of the guiding member.

According to this arrangement, since the shape of the guiding member can be maintained as a simple shape, better productivity and maintenance of the guiding member can be achieved.

In another preferred embodiment, a thickness To of the pair of rib projecting member is more than or equal to 0.5 mm.

If this thickness To of the pair of rib projecting member is less than 0.5 mm, there is a risk that the pair of rib projecting member may be broken during demolding resulting in degradation of productivity. Contrary, as this thickness creates a bump in a groove bottom at a place corresponding to the rib projection opening portion when the rib projection opening portion is devoid of the guiding member which may impact on hydroplaning performance, this thickness To of the pair of rib projecting member is preferably less than 25% of a height Dg of the rib.

In another advantageous embodiment, a width Wo of the rib projection opening portion is more than or equal to 0.5 mm wider than the diameter DC of the connecting member.

According to this arrangement, it is possible to provide minimum but enough space to allow the connecting member entering to/exiting from the guiding slit through the rib projection opening portion resulting minimum impact on creation of the bump in the groove bottom at the place corresponding to the rib projection opening portion when the rib projection opening portion is devoid of the guiding member which may impact on hydroplaning performance.

In another advantageous embodiment, a bottom end enlargement is formed at the closed end of the guiding slit.

According to this arrangement, penetration of the rubber into the guiding slit during molding can be improved, as this arrangement is able to limit deformation of the guiding member near the connecting member, thus rubber flashing in the groove after demolding is prevented.

BRIEF DESCRIPTION OF THE DRAWINGS

Other characteristics and advantages of the disclosure arise from the description made hereafter in reference to the annexed drawings which show, as nonrestrictive examples, the embodiments of the disclosure.

In these drawings:

FIG. 1 is a schematic plan view of a tread for a tire molded with a mold comprising a molding element according to first embodiment of the present disclosure;

FIG. 2 is an enlarged schematic perspective view showing a portion indicated as II in FIG. 1;

FIG. 3 is a schematic perspective view of a portion of the molding element according to first embodiment of the present disclosure;

FIG. 4 is a schematic perspective view of a portion of the molding element with a guiding member according to first embodiment of the present disclosure;

FIG. 5 is a cross sectional view taken along line V-V in FIG. 4;

FIG. 6 is a schematic cross sectional view of the molding element and a green tire with a connecting member at one step of a molding using the molding element in FIG. 4;

FIG. 7 is a schematic cross sectional view of the molding element and a green tire with a connecting member at one step of a molding using the molding element in FIG. 4;

FIG. 8 is a schematic cross sectional view of the molding element and a green tire with a connecting member at one step of a molding using the molding element in FIG. 4;

FIG. 9 is a schematic cross sectional view of the molding element and a green tire with a connecting member at one step of a molding using the molding element in FIG. 4;

FIG. 10 is a schematic cross sectional view of the molding element and a tread for a tire with a connecting member at one step of a molding using the molding element in FIG. 4;

FIG. 11 is a schematic cross sectional view of a molding element according to second embodiment of the present disclosure;

FIG. 12 is a schematic cross sectional view of a molding element according to third embodiment of the present disclosure;

FIG. 13 is a schematic cross sectional view of a molding element according to fourth embodiment of the present disclosure;

DETAILED DESCRIPTION

Preferred embodiments of the present disclosure will be described below referring to the drawings.

A molding element 1 for a mold used for manufacturing a tread 101 of a tire, a mold comprising the molding element 1, and a tread 101 molded and vulcanized using the mold according to an embodiment of the present disclosure will be described referring to FIGS. 1 to 10.df FIG. 1 is a schematic plan view of a tread for a tire molded with a mold comprising a molding element according to a first embodiment of the present disclosure. FIG. 2 is an enlarged schematic perspective view showing a portion indicated as II in FIG. 1. FIG. 3 is a schematic perspective view of a portion of the molding element according to the first embodiment of the present disclosure. FIG. 4 is a schematic perspective view of a portion of the molding element with a guiding member according to the first embodiment of the present disclosure. FIG. 5 is a cross sectional view taken along line V-V in FIG. 4. FIGS. 6 to 9 are schematic cross sectional views of the molding element and a green tire with a connecting member at one step of a molding using the molding element in FIG. 4. FIG. 10 is a schematic cross sectional view of the molding element and a tread for a tire with a connecting member at one step of a molding using the molding element in FIG. 4.

The tread 101 is a tread for a tire having dimension 205/55R16 and comprises a plurality of circumferential grooves 103a extending in a tire circumferential direction indicated as XX' and axial grooves 103b extending in a generally tire axial direction indicated as YY'.

As shown in FIG. 1, a plurality of contacting elements 104 having generally rectangular parallelepiped shape is formed in the tread 101. The contacting element 104 is delimited by the circumferential grooves 103a in a circumferential direction and is delimited by axial grooves 103b in an axial direction. Thus, the contacting element 104 has two transverse faces (frontal faces) 1041, 1042 facing to circumferentially opposite directions.

Adjacently arranged contacting elements 104 in a circumferential direction are separated by the axial groove 103b. The contacting element 104 has a contact face 102 intended to come into contact with ground during rolling at a top portion thereof.

The tread 101 has the same structure as the conventional tread except for an arrangement regarding the connecting member 105 and is intended to be applied to a conventional pneumatic radial tire. Thus, description of the internal construction of the tread 101 will be omitted.

Between two circumferentially adjacent contacting elements 104, a connecting member 105 having a thin rod-like shape is provided. The connecting member 105 extends across the axial groove 103b between two circumferentially adjacent contacting elements 104, as shown in FIGS. 1 and 2.

In the present embodiment, one connecting member 105 is provided between circumferentially adjacent contacting elements 104 in axially central region in the tread 101. That is, in axially central area, circumferentially adjacent contacting elements 104 are connected by one connecting member 105.

On the other hand, two connecting members 105 are provided between circumferentially adjacent contacting elements 104 in axially outward regions in the tread 101. That is, in axially outward areas, circumferentially adjacent contacting elements 104 are connected by two connecting members 105. Two connecting members 105 are positioned at the same radial position.

In the present embodiment, the connecting members 105 are arranged so as to extend substantially along the circumferential direction maintaining the same distance from the rotation axis of the tire. That is, the connecting members 105 extend in parallel to the contact face 102.

Each connecting member 105 extends along the circumferential groove 103a, thus an angle of an extending direction of the connecting member 105 relative to the tire circumferential direction is 0 degree.

In the arrangement of the first embodiment, inhomogeneity of the bending stiffness of the tread 101 in circumferential direction can be drastically decreased, which results less excitation of internal construction of the tire. Thus, noise generated during rolling of the tire can be reduced.

Next, a molding element 1 for a mold used for manufacturing the tread 101 will be described referring to FIGS. 3, 4 and 5.

As shown in FIG. 3, the molding element 1 has a molding surface 2 intended to mold the contact face 102 of the contacting element 104. The molding element 1 also has a plurality of ribs 3 intended to mold the groove 103a, 103b so as to radially outwardly extend from the molding surface 2.

The rib 3 includes a rib top face 31 intended to mold a bottom of the groove 103a, 103b. A radial position of the rib top face 31 can be the same among the ribs 3, or can be different among the ribs 3.

The rib 3 intended to mold the axial groove 103b also includes circumferentially opposing rib side faces 41, 42 intended to mold the frontal faces 1041, 1042 of the contacting element 104. The rib 3 intended to mold the axial groove 103b includes a notching portion 6. The notching portion 6 is formed by removing a part of the rib 3 and has generally rectangular parallelepiped shape defined by a bottom face 61 and axially opposing side faces 62, 63.

The notching portion 6 receives therein a guiding member 5 having a top face 54 and circumferentially opposed two side faces 52, 53 and complemental to the notching portion 6. An internal space of the notching portion 6 is filled with the guiding member 5 such that the top face 54 is flush with the rib top face 31 and the side faces 52, 53 are flush with the rib side faces 41, 42 of the rib 3, respectively, as shown in FIG. 4. Thus, the side faces 52, 53 of the guiding member 5 are to form a part of the frontal side faces 1041, 1042 of the contacting element 104.

The material constituting the guiding member 5 has a modulus at 10% elongation lower than that of the molding element. The material of the guiding member 5 is preferably an elastomeric composition. An example of the elastomeric composition is, for example saturated or unsaturated rubbers and thermoplastic elastomers.

A modulus of the elastomeric composition constituting the guiding member 5 at 10% elongation is within the range of 0.8 MPa and 2.5 MPa, preferably within the range of 0.9 MPa and 2.0 MPa and more preferably within the range of 1.0 MPa and 1.7 MPa.

An elongation rupture of the elastomeric composition constituting the guiding member 5 is more than or equal to 50%, preferably more than or equal to 100%, more preferably more than or equal to 150% and still more preferably between 200% and 500%.

Shore A hardness of the elastomeric composition constituting the guiding member 5 is within the range of 30 to 60, preferably within the range of 35 to 50.

The guiding member 5 has a guiding slit 51 extending circumferentially through the guiding member 5 and radially inwardly from the top face 54. That is, the guiding slit 51 extends from one of the opposite two side faces 52, 53 to the other of the opposite two side faces 52, 53 through the guiding member 5 and is open to the side faces 52, 53 and the top face 54 of the guiding member 5.

As shown in FIG. 5, a radially outward end of the guiding slit 51 opens at an axially central position on the top face 54 of the guiding member 5. The guiding slit 51 terminates at a closed end 511 near the bottom face 61 of the notching portion 6. A radial distance Ds between the closed end 511 of the guiding slit 51 and the bottom face 61 of the notching portion 6, is more than or equal to 1.0 mm. A radial distance Di between the molding surface 2 and the bottom face 61 of the notching portion 6 will define a position of the connecting member 105 after demolding together with the radial distance Ds between the closed end 511 of the guiding slit 51 and the bottom face 61 of the notching portion 6.

Although the guiding slit 51 extends radially in the present embodiment, the guiding slit may extend with an angle relative to radial orientation for better demolding of the connecting member 105 for example in a region where an orientation perpendicular to the molding surface 2 differs from radial orientation of the molding element 1. The guiding slit 51 may extend along slightly curved path in radial orientation and/or in circumferential orientation.

The guiding member 5 has a width Wi which is more than or equal to twice a diameter DC of the connecting member 105. This width Wi is preferably less than four times a diameter DC of the connecting member 105. In case the guiding member 5 has non-rectangular shape, this width Wi should be considered as a minimum width of the guiding member 5.

A manufacturing of a tread 101 of a tire using a molding element of the first embodiment will be described referring to FIGS. 6 to 10.

As shown in FIG. 6, as a first step, at least one connecting member 105 having diameter DC is circumferentially disposed on a surface of an unvulcanized green tire 107. The unvulcanized green tire 107 with the connecting member 105 is placed in a mold having at least one molding element 1 described above.

The connecting member 105 is an elongated member such as cable, wire or strings. The connecting member 105 may be put on the surface of unvulcanized green tire 107, partly or completely, manually or automatically using a process similar to put semi-finished material circumferentially. The connecting member 105 may be sticked onto the surface of unvulcanized green tire 107 with a help of, for example an adhesive or another unvulcanized rubber.

Then, as shown in FIG. 7, as the unvulcanized green tire 107 is moved toward the mold element 1, the connecting member 105 on the surface of the unvulcanized green tire 107 is in contact with an upper end of the guiding slit 51 and then, forcibly opens the upper end of the guiding slit 51.

Then, the connecting member 51 is continuously pushed downwardly by portions of the green tire 107 located in circumferentially both sides of the rib 3 and penetrated into and moved downwardly toward the closed end 511 along the guiding slit 51 as shown in FIG. 8, deforming the guiding member 5 outwardly in a width direction. Once the connecting member 51 has passed, the guiding slit 51 is closed again.

Once the connecting member 105 reaches the closed end 511 of the guiding slit 51 as shown in FIG. 9, the connecting member 105 cannot be further moved and stop at the closed end 511. On the other hand, the portions of the green tire 107 located in circumferentially both sides of the rib 3 further continuously downwardly moves toward the molding surface 2 of the molding element 1. Since the guiding slit 51 is closed behind the connecting member 105, the rubber does not enter into the guiding slit 51.

Once the portions of the green tire 107 located in circumferentially both sides of the rib 3 reaches the molding surface 2 of the molding element 1, the portions of the green tire 107 stop moving and the mold is closed.

Then heat and pressure is applied for vulcanizing and molding the green tire 107. During this process, the green tire 107 is turned to the tread 101 of the tire, to which tread 101 the connecting member 105 is fixedly attached so as to connect two frontal faces 1041, 1042 of the adjacent contacting elements 104. Specifically, a part of the connecting member 105 is exposed in the axial groove 103b and remaining part of the connecting member 105 is embedded in the contacting elements 104.

After completion of vulcanization and molding, the mold is opened as shown in FIG. 10. During demolding, the part of the connecting member 105 exposed in the axial groove 103b is escaped from the guiding member 5 passing through the guiding slit 51.

With the molding element 1, it is possible to manufacture the tread 101 of a tire having the plurality of contacting element 104 delimited by a plurality of the grooves 103 and having the connecting members 105 connecting two side faces 1041, 1042, 1043, 1044 of adjacent contacting elements 104 without complicated process and thus it is possible to improve productivity for manufacturing such tread 101.

Since the guiding slit 51 opens to the two side faces 52, 53 and the top face 54 of the guiding member 5 and extends radially, it is possible to position the connecting member 105 at a predetermined position in the contacting elements 104 and to leave the connecting member 105 there without any complicated process.

Since the material constituting the guiding member 5 has lower modulus at 10% elongation than that of the molding element 1, it is possible to let the connecting member 105 easily enter to/exit from the guiding slit 51. Further, once the connecting member 105 has passed, the guiding slit 51 is closed, the rubber does not flash into the guiding slit 51 during molding.

Since the notching portion 6 is filled with the guiding member 5 made of the material different from material constituting the molding element 1, it is possible to maintain a form of the side faces 1041, 1042, 1043, 1044 of the contacting element 104. As a result hydroplaning performance can be maintained.

Since the guiding member 5 is a separate and replaceable member, maintenance of the molding element 1 can be easier.

Since the elastomeric composition constituting the guiding member 5 is different from the material constituting the molding element 1, it is possible to prevent rubber from being penetrated into the guiding slit 51 during molding.

Since the guiding slit 51 does not open to the bottom face 61 thanks to the closed end 511, the connecting member 105 does not enter into a space between the guiding member 5 and a bottom face 61 of notching portion 6.

Since the radial distance Ds between a bottom face 61 of the notching portion 6 and the closed end 511 of the guiding slit 51 of the guiding member 5 is set more than or equal to 1.0 mm, the guiding slit 51 does not easily tear toward the bottom face 61 of notching portion 6 during molding.

Since modulus of the elastomeric composition constituting the guiding member 5 at 10% elongation is set within the range of 0.8 MPa and 2.5 MPa, preferably within the range of 0.9 MPa and 2.0 MPa and more preferably within the range of 1.0 MPa and 1.7 MPa, excess distortion of the guiding member 5 can be prevented. As a result, the connecting member 105 can easily enter into the guiding slit.

Since an elongation rupture of the elastomeric composition constituting the guiding member 5 is set more than or equal to 50%, preferably more than or equal to 100%, more preferably more than or equal to 150% and still more preferably between 200% and 500%, possible destruction/split by stress applied from the connecting member 105 during molding and demolding can be prevented.

Since a shore A hardness of the elastomeric composition constituting the guiding member 5 is set within the range of 30 to 60, preferably within the range of 35 to 50, excess distortion of the guiding member 5 can be prevented.

The guiding slit 51 placed widthwisely, in cut view perpendicular to the molding surface 2 and parallel to an extension direction of the rib 3 having the notching portion 6, at a center region of the guiding member 5 provides good endurance of the guiding member 5 as high stress applied via the connecting member 105 to the guiding member 5 during molding and demolding would be distributed evenly throughout whole the guiding member 5 for further productivity improvement.

Since the width Wi of the guiding member 5 is set more than or equal to twice a diameter DC of the connecting member 105, a risk that the connecting member 105 may not be able to pass through the guiding slit 51 during molding and demolding due to insufficient volume to pass through for the connecting member 105 to compress the guiding member for more reliable productivity improvement.

Alternatively, the notching portion 6 is filled with the guiding member 5 may be made of a liquid elastomeric composition which will have necessary characteristics described above after certain period of duration after being filled into the notching portion 6.

A molding element 1 according to a second embodiment of the present disclosure will be described referring to FIG. 11. FIG. 11 is a schematic cross sectional view of a molding element according to the second embodiment of the present disclosure. The constitution of this second embodiment is similar to that of the first embodiment other than the arrangement shown in FIG. 11, thus description will be made referring to FIG. 11.

In the second embodiment, the top face 54 of the guiding member 5 is partially covered by a pair of rib projecting member 35 projecting inwardly from opposed side faces 62, 63 of the notching portion 6, and a central part of the top face 54 is exposed through a rib projection opening portion 36 formed between the pair of rib projecting member 35. A guiding slit 51 is provided at the central exposed part of the top face 54 exposed through a rib projection opening portion 36. The rib projection opening portion 36 is devoid of the guiding member 5.

The pair of rib projecting member 35 has a thickness To which is more than or equal to 0.5 mm, and the rib projection opening portion 36 has a width Wo which is more than or equal to 0.5 mm wider than a diameter DC of the connecting member 105.

By the pair of rib projecting member 35, it is possible to prevent the guiding member 5 from slipping out of the notching portion 6 during demolding while securing the connecting member 105 entering to/exiting from the guiding slit 51.

Since the rib projection opening portion 36 is devoid of the guiding member 5, the guiding member 5 has a simple shape such as rectangular resulting better productivity and maintenance of the guiding member 5.

Since the thickness To of the pair of rib projecting member 35 is set more than or equal to 0.5 mm, risk that the pair of rib projecting member may be broken during demolding is avoidable.

Since the width Wo of the rib projection opening portion 36 is more than or equal to 0.5 mm wider than the diameter DC of the connecting member 105, minimum but enough space for entering/exiting the connecting member 105 can be obtained.

A molding element 1 according to a third embodiment of the present disclosure will be described referring to FIG. 12. FIG. 12 is a schematic cross sectional view of a molding element according to second embodiment of the present disclosure. The constitution of this third embodiment is the similar to that in the second embodiment other than the arrangement shown in FIG. 12, thus description will be made referring to FIG. 12.

In the third embodiment, the guiding member 5' has a shape so as to additionally fill the rib projection opening portion 36.

Since the rib projection opening portion 36 is also filled with the guiding member 5', creation of a bump in the groove 103 at the place corresponding to the rib projection opening portion 36 is avoidable. As a result, potential impact on hydroplaning performance due to degradation of groove volume can be prevented.

A molding element 1 according to a fourth embodiment of the present disclosure will be described referring to FIG. 13. FIG. 13 is a schematic cross sectional view of a molding element according to fourth embodiment of the present disclosure. The constitution of this fourth embodiment is the similar to that in the first embodiment other than the arrangement shown in FIG. 13, thus description will be made referring to FIG. 13.

In the fourth embodiment, an enlarged portion 512 is formed at the closed end 511 of the guiding slit 51.

By the enlarged portion 512, it is possible to limit deformation of the guiding member 5.

The disclosure is not limited to the examples described and represented and various modifications can be made there without leaving its framework.

The invention claimed is:

1. A mold for a tread of a tire, the tread having a plurality of contacting elements delimited by a plurality of grooves, and a connecting member to connect two side faces of adjacent contacting elements of the plurality of contacting elements, the mold comprising:
    a molding element comprising;
        a molding surface for forming a contact face of each of the plurality of contacting elements, and
        a rib for forming one of the plurality of grooves, being between the adjacent contacting elements, the rib having a notching portion,
        at least two rib side faces forming a set of side faces of one of the contacting elements;
    a guiding member made of a material different from a material of the molding element;
    wherein the guiding member is received in the notching portion and has two opposite side faces configured to form the set of side faces and a top face configured to form a part of a bottom of one of the plurality of grooves; and
    said material of the guiding member has a modulus at 10% elongation lower than that of the molding element, and the guiding member has a guiding slit extending from one of the two opposite side faces to the other of the two opposite side faces through the guiding member and radially from the top face.

2. The mold according to claim 1, wherein the material constituting the guiding member is an elastomeric composition.

3. The mold according to claim 1, wherein the guiding slit has a closed end radially closer to a bottom face of the notching portion than to the top face of the rib.

4. The mold according to claim 3, wherein a radial distance Ds between the bottom face of the notching portion and the closed end of the guiding slit of the guiding member is more than or equal to 1.0 mm.

5. The mold according to claim 2, wherein a modulus of the elastomeric composition constituting the guiding member at 10% elongation is within the range of 0.8 MPa and 2.5 MPa.

6. The mold according to claim 2, wherein an elongation rupture of the elastomeric composition constituting the guiding member is more than or equal to 50%.

7. The mold according to claim 2, wherein a shore A hardness of the elastomeric composition constituting the guiding member is within the range of 30 and 60.

8. The mold according to claim 1, wherein the guiding slit is widthwisely located, in cut view perpendicular to the molding surface and parallel to an extension direction of the rib having the notching portion at a center region of the guiding member.

9. The mold according to claim 1, wherein a width Wi of the guiding member is more than or equal to twice a diameter DC of the connecting member.

10. The mold according to claim 1, wherein the top face of the guiding member is partly covered by a pair of rib projecting members projecting inwardly from opposed side faces of the notching portion and the guiding slit is exposed through a rib projection opening portion formed between the pair of rib projecting members.

11. The mold according to claim 10, wherein the rib projection opening portion is devoid of the guiding member.

12. The mold according to claim 10, wherein a thickness To of the pair of rib projecting members is more than or equal to 0.5 mm.

13. The mold according to claim 10, wherein a width Wo of the rib projection opening portion is more than or equal to 0.5 mm wider than the diameter DC of the connecting member.

14. The mold according to claim 3, wherein an enlarged portion is formed at the closed end of the guiding slit.

* * * * *